(12) United States Patent
Wang et al.

(10) Patent No.: US 10,914,880 B2
(45) Date of Patent: Feb. 9, 2021

(54) POLARIZER, DISPLAY PANEL, DISPLAY APPARATUS, AND WEARABLE DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Linlin Wang, Beijing (CN); Dongliang Wang, Beijing (CN); Dan Wang, Beijing (CN); Huabin Chen, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 190 days.

(21) Appl. No.: 16/325,311

(22) PCT Filed: May 30, 2018

(86) PCT No.: PCT/CN2018/088931
§ 371 (c)(1),
(2) Date: Feb. 13, 2019

(87) PCT Pub. No.: WO2018/228185
PCT Pub. Date: Dec. 20, 2018

(65) Prior Publication Data
US 2019/0204487 A1 Jul. 4, 2019

(30) Foreign Application Priority Data

Jun. 15, 2017 (CN) .................. 2017 2 0700265 U

(51) Int. Cl.
G02B 5/30 (2006.01)
G02B 1/04 (2006.01)
G02B 3/08 (2006.01)

(52) U.S. Cl.
CPC .......... *G02B 5/3025* (2013.01); *G02B 1/041* (2013.01); *G02B 3/08* (2013.01); *G02B 5/30* (2013.01)

(58) Field of Classification Search
CPC ........ G02B 5/3025; G02B 5/30; G02B 1/041; G02B 1/14; G02B 3/08
See application file for complete search history.

(56) References Cited

FOREIGN PATENT DOCUMENTS

| CN | 202008086 U | 10/2011 |
|---|---|---|
| CN | 102414586 A | 4/2012 |
| CN | 103048841 A | 4/2013 |
| CN | 103261943 A | 8/2013 |
| CN | 205992098 U | 3/2017 |
| CN | 206863266 U | 1/2018 |

OTHER PUBLICATIONS

PCT International Search Report, Application No. PCT/CN2018/088931, dated Aug. 22, 2018, 6 pages: with English translation.
PCT Written Opinion, Application No. PCT/CN2018/088931, dated Aug. 22, 2018, 5 pages.: with English translation of relevant part.

*Primary Examiner* — Wen Huang
(74) *Attorney, Agent, or Firm* — Armstrong Teasdale LLP

(57) ABSTRACT

Embodiments of the present disclosure provide a polarizer, a display panel, a display apparatus, and a wearable device. The polarizer includes a polarizing layer and a lens layer arranged in stack, wherein the lens layer includes at least one converging lens.

13 Claims, 2 Drawing Sheets

US 10,914,880 B2

POLARIZER, DISPLAY PANEL, DISPLAY APPARATUS, AND WEARABLE DEVICE

CROSS REFERENCE TO RELATED APPLICATIONS

This patent application is a National Stage Entry of PCT/CN2018/088931 filed on May 30, 2018, which claims the benefit and priority of Chinese Patent Application No. 201720700265.1 filed on Jun. 15, 2017, the disclosures of which are incorporated by reference herein as part of the present application.

BACKGROUND

The present disclosure relates to the field of display technologies, and more particularly, to a polarizer, a display panel, a display apparatus, and a wearable device.

With the development of technologies of wearable smart devices and continuous improvement of people's consumption level, smart glasses products such as virtual reality (VR) glasses are more and more popular among consumers.

BRIEF DESCRIPTION

A first aspect of the present disclosure provides a polarizer including a polarizing layer and a lens layer arranged in stack, wherein the lens layer includes at least one converging lens.

In an exemplary embodiment, the polarizer further includes a first protection layer arranged on a side of the polarizing layer away from the lens layer and an adhesive layer arranged on a side of the first protection layer away from the polarizing layer.

In an exemplary embodiment, the polarizer further includes a first surface protection layer arranged on a side of the lens layer away from the polarizing layer.

In an exemplary embodiment, the polarizer further includes a second protection layer arranged between the lens layer and the polarizing layer.

In an exemplary embodiment, the converging lens is a Fresnel lens.

In an exemplary embodiment, a material of the lens layer is polyolefin.

Another aspect of the present disclosure provides a display panel, which includes a first substrate and a polarizer attached onto the first substrate, wherein the polarizer is the polarizer in one or more embodiments of the present disclosure relating to the polarizer.

In an exemplary embodiment, the first substrate is a color film substrate.

In an exemplary embodiment, the lens layer includes a plurality of converging lenses, and each of the converging lenses corresponds to at least one pixel unit on the color film substrate.

Still another aspect of the present disclosure provides a display apparatus, which includes a display panel in one or more embodiments relating to a display panel.

Still another aspect of the present disclosure provides a wearable device, which includes a display apparatus in one or more embodiments relating to the display apparatus.

In an exemplary embodiment, the wearable device includes a pair of virtual reality (VR) glasses.

BRIEF DESCRIPTION OF THE DRAWINGS

To describe the technical solutions of the embodiments of the present disclosure more clearly, the accompanying drawings required to be used in the description of the embodiments of the present disclosure will be briefly introduced below. Apparently, the accompanying drawings in the following description show merely some embodiments of the present disclosure, and persons of ordinary skill in the art may still derive other drawings from these accompanying drawings without creative efforts.

Corresponding reference numerals indicate corresponding parts or features throughout the several views of the drawings.

DETAILED DESCRIPTION

Technical solutions in embodiments of the present disclosure will be described clearly and completely below with reference to the accompanying drawings in embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

As used herein and in the appended claims, the singular form of a word includes the plural, and vice versa, unless the context clearly dictates otherwise. Thus, singular words are generally inclusive of the plurals of the respective terms.

In practical application, after people wear VR glasses, distances from display screens of the VR glasses to human eyes generally are about 3 cm-7 cm. Objects seeable to human eyes of healthy adults usually need to be more than 7 cm away from the human eyes. Therefore, generally a convex lens or an optical element having a lens-like effect is arranged outside the display screen of the VR glasses. The convex lens or the optical element can refract light to shorten a focusing distance, such that close-range objects also can be imaged on retinas of the human eyes. In this way, people can clearly see the objects displayed on the display screen of the VR glasses when wearing the VR glasses.

In the VR glasses, as described above, the focusing distance may be shortened by adding the convex lens outside the display screen, and thus the human eyes can clearly see the objects displayed on the display screen of the VR glasses. However, since the convex lens itself is thick, the thickness of the VR glasses may be increased if the convex lens is additionally arranged outside the display screen, which may affect the appearance of the VR glasses and even degrade the user experience.

Figure 1:
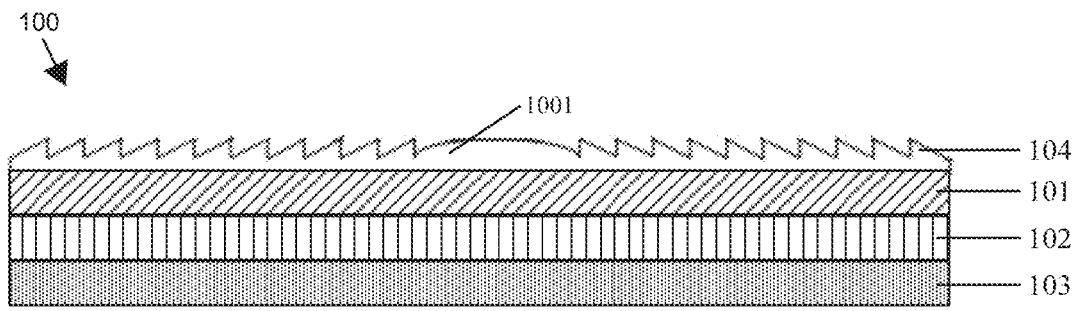
FIG. 1 is a schematic structural diagram of a polarizer according to an embodiment of the present disclosure.

Referring to FIG. 1, a schematic structural diagram of a polarizer 100 according to an embodiment of the present disclosure is illustrated. As shown in FIG. 1, the exemplary polarizer 100 in the embodiment may include a polarizing layer 101 and a lens layer 104. The lens layer 104 may include a converging lens 1001.

In some embodiments, the converging lens 1001 may be a Fresnel lens. A surface of the Fresnel lens attached to the polarizing layer is a plane, and a surface of the Fresnel lens away from the polarizing layer is provided with a plurality of concentric circle structures.

In one or more embodiments of the present disclosure, the polarizer 100 of a display apparatus is provided with the lens layer 104 having the converging lens 1001. When light from the display apparatus transmits through the polarizer 100, the light may be focused onto the retina of the human eye because the lens layer 104 has a focusing effect on the light. Therefore, the human eye may see an image on the display apparatus at a near distance, and it is unnecessary to additionally arrange a convex lens, and thus the thickness of the display apparatus may be reduced.

In an exemplary embodiment, as shown in FIG. 1, the polarizer 100 may further include a first protection layer 102 arranged on a side of the polarizing layer 101 away from the lens layer 104 and an adhesive layer 103 arranged on a side of the first protection layer 102 away from the polarizing layer 101.

In the structure as shown in FIG. 1, the polarizing layer 101 may generate or detect polarized light. In the case of being used in a display panel, the polarizing layer 101 may control the emission intensity of light. Generally, the polarizing layer has high transmittance, high polarization degree and good hue, etc. The first protection layer 102 is used for protecting the polarizing layer 101 from adverse effects of ambient environment. The adhesive layer 103 may be used for attaching the polarizer 100 onto a substrate (such as a color film substrate) of the display panel.

Figure 2:
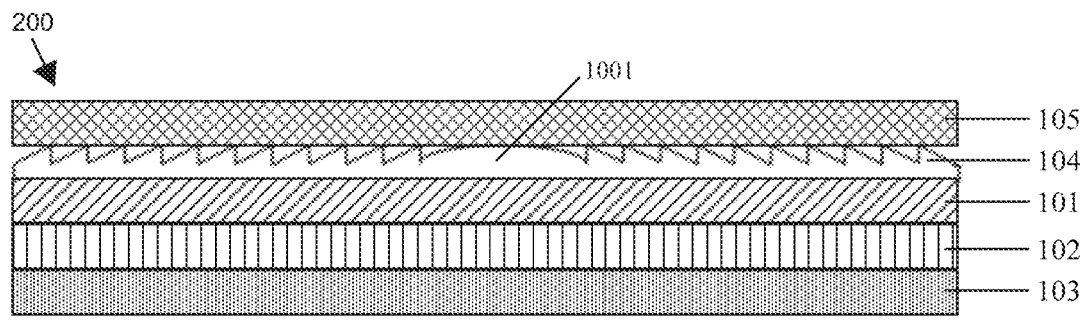
FIG. 2 is a schematic structural diagram of another polarizer according to an embodiment of the present disclosure.

FIG. 2 illustrates a schematic structural diagram of another polarizer 200 according to an embodiment of the present disclosure. In addition to the structure as shown in FIG. 1, the polarizer 200 as shown in FIG. 2 may further include a first surface protection layer 105, which is arranged on a side of the lens layer 104 away from the polarizing layer 101. The first surface protection layer 105 may prevent the polarizer 200 from being scratched during it is used.

Figure 3:
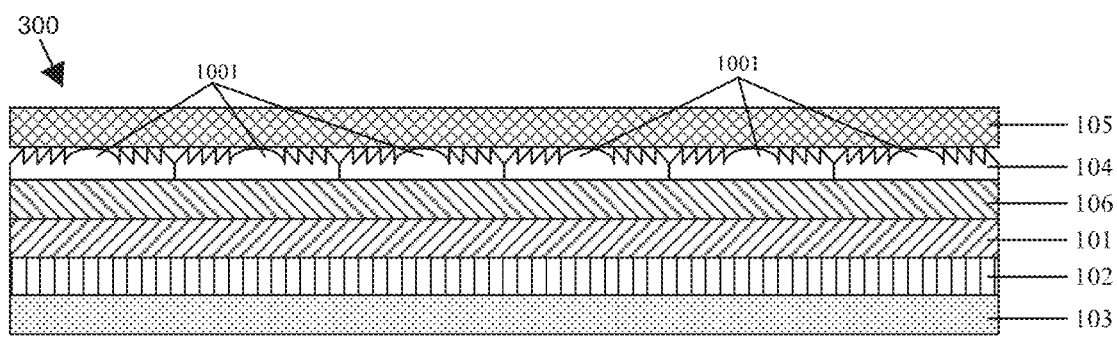
FIG. 3 is a schematic structural diagram of still another polarizer according to an embodiment of the present disclosure.

FIG. 3 illustrates a schematic structural diagram of still another polarizer 300 according to an embodiment of the present disclosure. In the polarizer 300 as shown in FIG. 3, the lens layer 104 may include a plurality of converging lenses 1001, which may be Fresnel lenses. A surface of the Fresnel lens is a plane, and the other surface of the Fresnel lens is carved with a plurality of concentric circle structures. Textures of the Fresnel lens may be designed according to interference and diffraction of light and to requirements for a relative sensitivity and a receiving angle. In an embodiment of the present disclosure, structural parameters of the Fresnel lens are not specifically limited. In practical application, the structural parameters of the Fresnel lens may be designed based on different distances from the polarizer 300 to the human eye when it is used, different sizes of the display apparatus, and shortsightedness or farsightedness of different degrees.

In a specific embodiment, the surface of the lens layer 104 away from the polarizing layer is uneven, and the surface of the polarizing layer 101 is flat. In the case where the lens layer 104 has a larger area and a more complicated surface, in order to avoid adverse effects on the polarizing layer 101 adjacent to the lens layer 104 during processing, a second protection layer 106 may be arranged between the lens layer 104 and the polarizing layer 101 to protect the polarizing layer 101 in an embodiment of the present disclosure.

To facilitate light to transmit through the polarizer, the converging lens of the lens layer 104 may be manufactured by transparent polyolefin by way of pressing. Of course, those skilled in the art also may use other transparent materials to manufacture the lens layer 104, and the embodiments of the present disclosure do not specifically limit the materials made of the lens layer 104.

In one or more embodiments of the present disclosure, the polarizer of a display apparatus is provided with the lens layer 104 having a plurality of converging lens 1001. When light from the display apparatus transmits through the polarizer, the light may be focused onto the retina of the human eye because the lens layer has a focusing effect on the light. Therefore, the human eye may see an image on the display apparatus at a near distance, and it is unnecessary to additionally arrange a convex lens, and thus the thickness of the display apparatus may be reduced.

An embodiment of the present disclosure also provides a display panel. Alternatively, the display panel may include at least one polarizer according to the present disclosure, such as according to one or more embodiments disclosed above in detail. Therefore, reference may be made to embodiments of the polarizer for the alternative embodiments of the display panel.

In an exemplary embodiment, the display panel may include a first substrate and a polarizer attached onto the first substrate according to one or more embodiments of the present disclosure. Alternatively, the first substrate may be a color film substrate.

Figure 4:
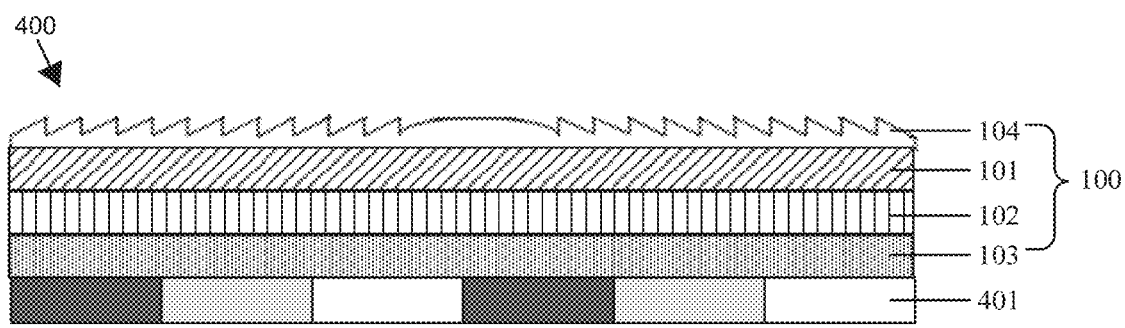
FIG. 4 is a schematic structural diagram of a display panel according to an embodiment of the present disclosure.

FIG. 4 illustrates a schematic structural diagram of a display panel 400 according to an embodiment of the present disclosure. The display panel 400 as shown in FIG. 4 may include a first substrate 401 and a polarizer attached onto the first substrate 401. The polarizer may be a polarizer 100 in the embodiment as shown in FIG. 1, and the first substrate 401 may be a color film substrate. When light from the color film substrate 400 transmits through the polarizer 100, the light may be focused onto the retina of the human eye because the lens layer 104 of the polarizer 100 has a focusing effect on the light, such that the human eye may see an image on the display apparatus at a near distance.

Only the structure of the polarizer 100 is illustrated in FIG. 4. However, it may be understood that the polarizers such as, the polarizer 200 and the polarizer 300 in the one or more embodiments disclosed above in detail having other structures provided by some embodiments of the present disclosure also are applicable to the display panel of the present disclosure.

Figure 5:
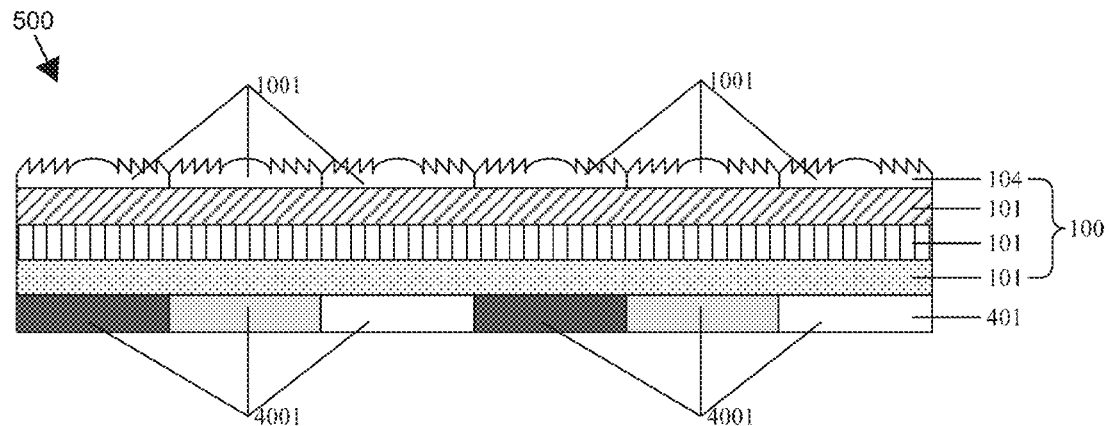
FIG. 5 is a schematic structural diagram of another display panel according to an embodiment of the present disclosure.

FIG. 5 illustrates a schematic structural diagram of another display panel 500 according to an embodiment of the present disclosure. In the display panel 500 as shown in FIG. 5, the polarizer 100 may include a plurality of converging lenses 1001 which may correspond, one to one, to the pixel units 4001 on the color film substrate 400. The converging lenses 1001 may be designed according to interference and diffraction of light and requirements for a relative sensitivity and a receiving angle. In some embodiments of the present disclosure, structural parameters of the converging lenses are not specifically limited. In practical application, the structural parameters of the converging lenses may be designed based on different distances from the polarizer to the human eye when it is used, different sizes of the display apparatus, and shortsightedness or farsightedness of different degrees.

Only the structure of the polarizer 100 is illustrated in FIG. 5. However, it may be understood that the polarizers such as the polarizer 200 and the polarizer 300 in the one or more embodiments disclosed above in detail having other structures provided by some embodiments of the present disclosure also are applicable to the display panel of the present disclosure.

In an embodiment of the present disclosure, the polarizer is attached onto the color film substrate of the display panel, and the polarizer is provided with the lens layer. When light from the display panel transmits through the polarizer, the light may be focused on the retina of the human eye because the lens layer has a focusing effect on the light. Therefore, the human eye may see the image on the display panel at a near distance, and it is unnecessary to additionally arrange a convex lens, and thus the thickness of the display apparatus may be reduced.

Figure 6:
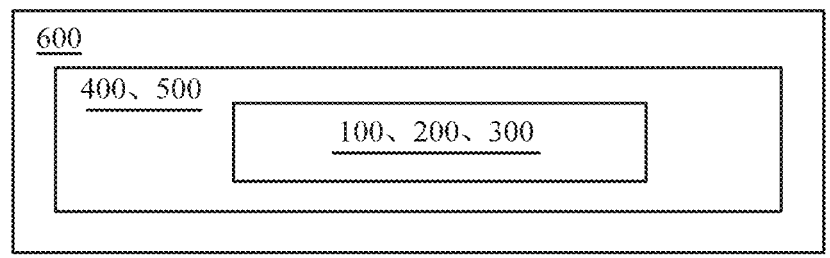
FIG. 6 is an exemplary block diagram of a display apparatus according to an embodiment of the present disclosure.

An embodiment of the present disclosure further provides a display apparatus, which includes a display panel having the above structure. FIG. 6 illustrates an exemplary block diagram of a display apparatus 600 according to an embodiment of the present disclosure. As shown in FIG. 6, the display apparatus 600 may include the display panel 400, 500 in the one or more embodiments disclosed above in detail. The display panel may include the polarizer 100, 200, and 300 in the one or more embodiments disclosed above in detail. Therefore, reference may be made to the embodiments of the polarizer and the display panel for an alternative embodiment of the display apparatus.

Those skilled in the art should understand specific manners for arranging the display panel having the above structure on the display apparatus, which are not described in detail in the embodiments of the present disclosure.

Figure 7:
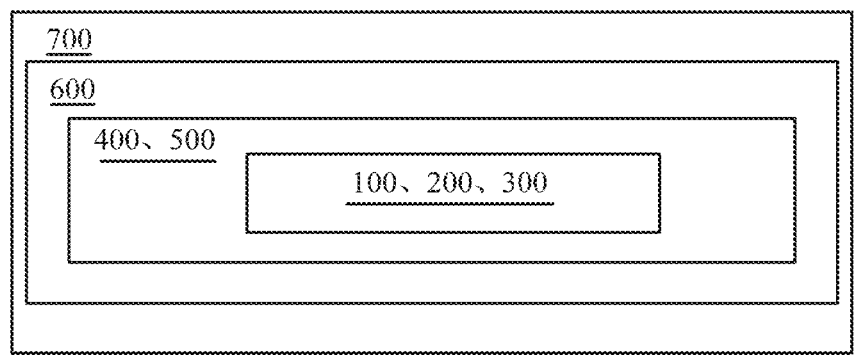
FIG. 7 is an exemplary block diagram of a wearable device according to an embodiment of the present disclosure.

An embodiment of the present disclosure also discloses a wearable device, which includes the display apparatus having the above structure. FIG. 7 illustrates an exemplary block diagram of a wearable device according to an embodiment of the present disclosure. As shown in FIG. 7, the wearable device 700 may include the display apparatus 600 in the one or more embodiments disclosed above in detail. The display apparatus 600 may include the display panel 400, 500 in the one or more embodiments disclosed above in detail. The display panel 400, 500 may include the polarizer 100, 200, and 300 in the one or more embodiments disclosed above in detail. Therefore, reference may be made to the embodiments of the polarizer, the display panel and the display apparatus for an alternative embodiment of the wearable device.

Those skilled in the art should understand specific manners for arranging the display apparatus having the above structure on the wearable device, which are not described in detail in the embodiments of the present disclosure.

In an exemplary embodiment, the wearable device may be a pair of virtual reality (VR) glasses.

Although some embodiments of the present disclosure have been described, those skilled in the art may make additional changes and modifications to these embodiments as soon as they are aware of the basic inventive concept. Therefore, the appended claims are intended to be interpreted as including example embodiments and all alterations and modifications thereof falling within the scope of the embodiments of the present disclosure.

Finally, it is to be noted that terms such as "comprise", "include" or any other variants thereof are intended to cover a non-exclusive inclusion so that a process, a method, an article, or a terminal device including a series of elements not only includes these elements, but also includes other elements not listed explicitly, or also includes inherent elements of the process, the method, the article, or the terminal device. Elements restricted by a sentence "include a . . . " do not exclude the fact that additional identical elements may exist in a process, a method, an article, or a terminal device of these elements without further restrictions.

The above is merely specific embodiments of the present disclosure, but the protection scope of the present disclosure is not limited thereto. Any variation or substitution easily conceivable to those skilled in the art shall fall into the protection scope of the present disclosure. Therefore, the protection scope of the present disclosure shall be subject to the protection scope of the claims.

What is claimed is:

1. A polarizer comprising a polarizing layer and a lens layer arranged in stack, wherein the lens layer comprises a plurality of converging lenses, wherein the polarizer is attached onto a first substrate, wherein the first substrate is a color film substrate, and wherein each of the converging lenses is a Fresnel lens that corresponds to at least one pixel unit on the color film substrate.

2. The polarizer according to claim 1, further comprising a first protection layer arranged on a side of the polarizing layer away from the lens layer and an adhesive layer arranged on a side of the first protection layer away from the polarizing layer.

3. The polarizer according to claim 1, further comprising a first surface protection layer arranged on a side of the lens layer away from the polarizing layer.

4. The polarizer according to claim 1, further comprising a second protection layer arranged between the lens layer and the polarizing layer.

5. The polarizer according to claim 1, wherein a material of the lens layer is polyolefin.

6. A display panel comprising a first substrate and a polarizer according to claim 1.

7. A display apparatus comprising the display panel according to claim 6.

8. A wearable device comprising the display apparatus according to claim 7.

9. The wearable device according to claim 8, wherein the wearable device comprises a pair of VR glasses.

10. The display panel according to claim 6, wherein the polarizer further comprises a first protection layer arranged on a side of the polarizing layer away from the lens layer and an adhesive layer arranged on a side of the first protection layer away from the polarizing layer.

11. The display panel according to claim 6, wherein the polarizer further comprises a first surface protection layer arranged on a side of the lens layer away from the polarizing layer.

12. The display panel according to claim 6, wherein the polarizer further comprises a second protection layer arranged between the lens layer and the polarizing layer.

13. The display panel according to claim 6, wherein a material of the lens layer is polyolefin.

* * * * *